United States Patent
Venkatesan et al.

(10) Patent No.: US 9,531,594 B2
(45) Date of Patent: Dec. 27, 2016

(54) SELF-CONFIGURING PORT SYSTEM

(71) Applicant: Dell Products L.P., Round Rock, TX (US)

(72) Inventors: Shathish Muthu Venkatesan, Vellore (IN); Kapil Adhikesavalu, Vellore (IN)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 14/196,124

(22) Filed: Mar. 4, 2014

(65) Prior Publication Data
US 2015/0256400 A1 Sep. 10, 2015

(51) Int. Cl.
*H04L 12/24* (2006.01)

(52) U.S. Cl.
CPC ....... *H04L 41/0886* (2013.01); *H04L 41/0809* (2013.01)

(58) Field of Classification Search
CPC .......................... H04L 41/0886; H04L 41/0809
See application file for complete search history.

(56) References Cited

U.S. PATENT DOCUMENTS

| 5,809,249 A * | 9/1998 | Julyan ............................ 709/223 |
| 9,100,123 B2 * | 8/2015 | Tang et al. |
| 2004/0208180 A1 * | 10/2004 | Light et al. ................. 370/395.2 |
| 2005/0196119 A1 * | 9/2005 | Popovic .............. H04L 49/3054 385/134 |

* cited by examiner

*Primary Examiner* — Mohammad Anwar
(74) *Attorney, Agent, or Firm* — Haynes and Boone, LLP

(57) ABSTRACT

A self-configuring port system includes a first type interface device that is configured to couple to a network switch port that is configured to operate in a plurality of different modes. A plurality of second type interface devices each coupled to the first type interface device by at least one cable. Each of the plurality of second type interface devices includes an auto-negotiation engine that is configured to advertise each of the plurality of different modes. When coupled to a respective peer device and advertising each of the plurality of different modes, each of the auto-negotiation engines in the plurality of second type interface devices is configured to perform an auto-negotiation function with the respective peer device to select a first mode of the plurality of different modes for use in transmitting data between the network switch port and the respective peer device.

20 Claims, 5 Drawing Sheets

SELF-CONFIGURING PORT SYSTEM

BACKGROUND

The present disclosure relates generally to information handling systems, and more particularly to a self-configuring port system for configuring a port on an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, network IHSs, include the ability to transmit and receive Ethernet protocol communications via transceivers such as Small Form-factor Pluggable (SFP) transceivers, enhanced Small Form-factor Pluggable (SFP+) transceivers, 10 Gigabit Small Form-factor Pluggable (XFP) transceivers, Quad(4-channel) Small Form-factor Pluggable (QSFP or QSFP+) transceivers, and/or a variety of other transceivers known in the art. Depending on the type of transceiver used, a port on a network IHS also include the ability to transmit data according to several variable transmission parameters including transmission speed, duplex mode, flow control, and/or a variety of other transmission parameters known in the art. In some situations, users may wish to use a port on a network IHS to communicate with multiple peer devices. For example, a user may connect a QSFP transceiver to a port on a network IHS, and that QSFP transceiver may be connected to a cable that splits to provide 4 BASE-T connectors that each may connect to a respective peer device. In order to configure the port on the network IHS to communicate with each of the peer devices, the user must manually configure the port on the network IHS to support transmission parameters that enable communication between the network IHS and each peer device. Such manual configuration of the network switch is time consuming and error-prone.

Accordingly, it would be desirable to provide an improved system for configuring a port.

SUMMARY

According to one embodiment, a self-configuring Ethernet system includes a first type interface device that is configured to couple to a network switch port that is configured to operate in a plurality of different modes, and a plurality of second type interface devices that are each coupled to the first type interface device by at least one cable. Each of the plurality of second type interface devices includes an auto-negotiation engine that is configured to advertise each of the plurality of different modes. When coupled to a respective peer device and advertising each of the plurality of different modes, each of the auto-negotiation engines in the plurality of second type interface devices is configured to perform an auto-negotiation function with the respective peer device to select a first mode of the plurality of different modes for use in transmitting data between the network switch port and the respective peer device. In some embodiments, the selected first mode may also be referred to as a "negotiated mode".

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
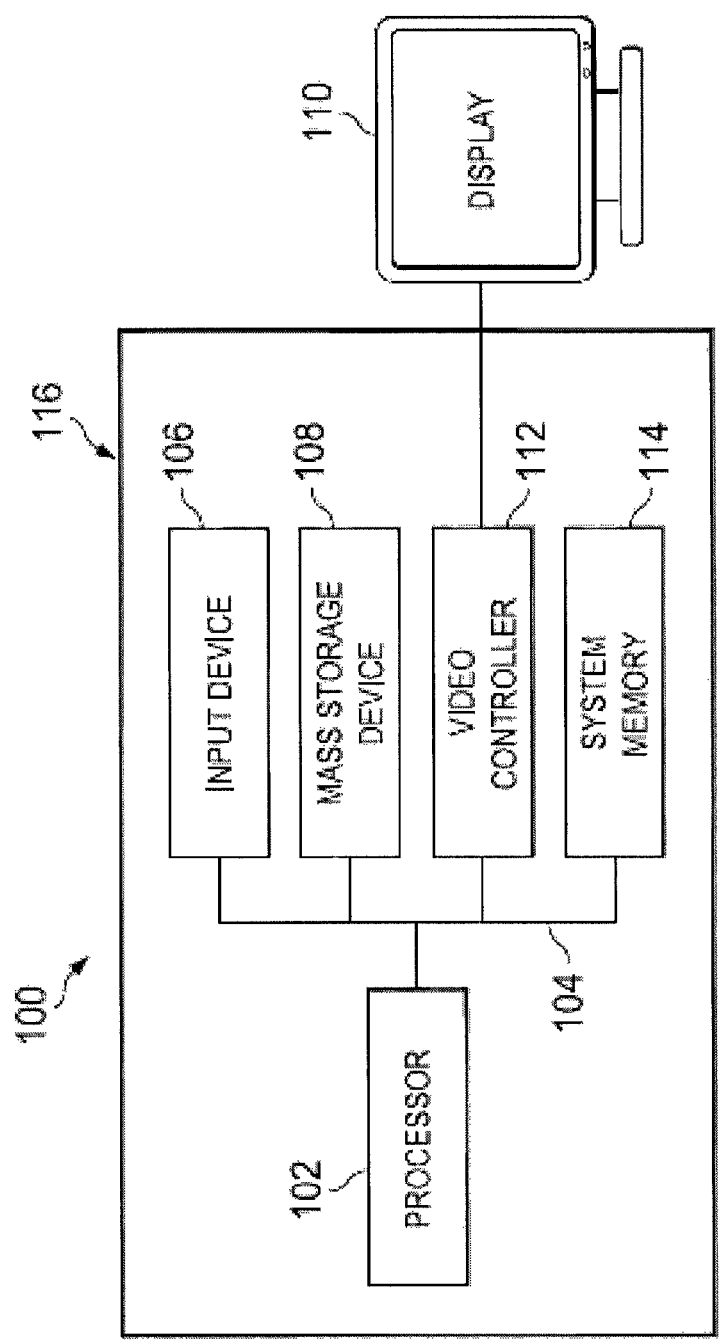
FIG. 1 is a schematic view illustrating an embodiment of an information handling system (IHS)

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
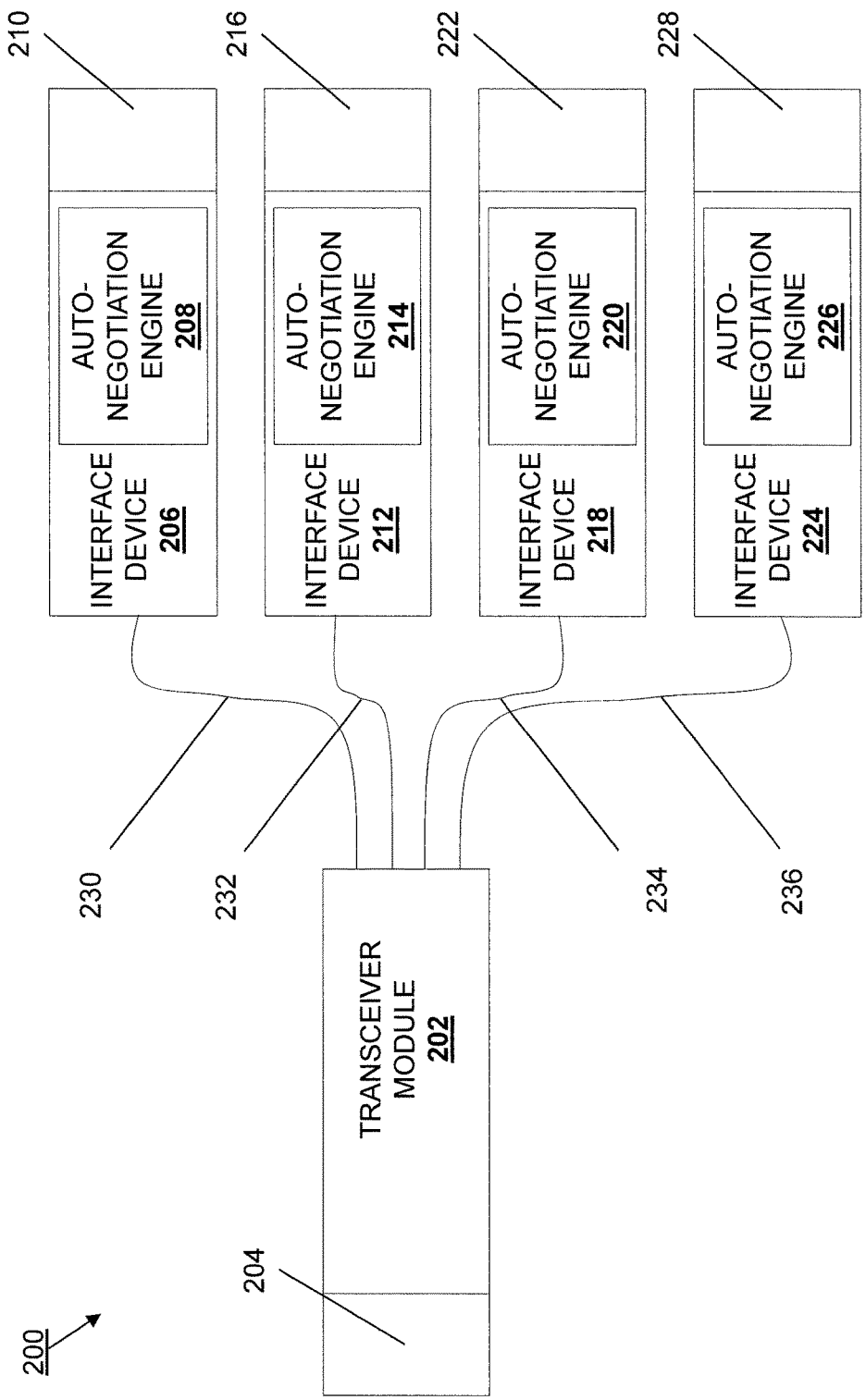
FIG. 2 is a schematic view illustrating an embodiment of a self-configuring port system.

Referring now to FIG. 2, an embodiment of a self-configuring port system 200 is illustrated. In some of the embodiments discussed below, the self-configuring port system 200 is described as a breakout cable useful for providing one-to-many communication between a network switch port and a plurality of peer devices, but other embodiments may provide for one-to-one communication between a network switch port and a single peer device. The self-configuring port system 200 includes a first type interface device, illustrated in FIG. 2 as a transceiver module 202, and a plurality of second type interface devices, illustrated in FIG. 2 as interface devices 206, 212, 218, 224. In the embodiments discussed below, the transceiver module 202 is alternatively described as a quad(4-channel) small form-factor pluggable (QSFP or QSFP+) transceiver module. Likewise, in the embodiments discussed below, the interface devices 206, 212, 218, 224 are described as BASE-T interface devices, which in various embodiments may include at least one of several variants such as 1000BASE-T, 100BASE-T, and 10BASE-T. The interface devices 206, 212, 218, 224 are each coupled to the transceiver module 202 by at least one cable, but other embodiments may provide for coupling by more than one cable or a single cable that extends from the transceiver module 202 and splits to provide separate cables that connect to the respective interface devices 206, 212, 218, and 224. Considering the example of FIG. 2, interface device 206 is coupled to transceiver module 202 by cable 230, interface device 212 is coupled to transceiver module 202 by cable 232, interface device 218 is coupled to transceiver module 202 by cable 234, and interface device 224 is coupled to transceiver module 202 by cable 236. Transceiver module 202 also includes a transceiver interface 204 that is configured to couple to a network switch port, as discussed below with reference to FIGS. 4 and 5. Similarly, interface devices 206, 212, 218, 224 include interface ports 210, 216, 222, and 228, respectively. As discussed below, interface ports 210, 216, 222, 228 provide for coupling to a respective peer device.

Each of the interface devices 206, 212, 218, 224 further includes an auto-negotiation engine. As illustrated in FIG. 2, interface device 206 includes an auto-negotiation engine 208, interface device 212 includes an auto-negotiation engine 214, interface device 218 includes an auto-negotiation engine 220, and interface device 224 includes an auto-negotiation engine 226. In some embodiments discussed below, each of the auto-negotiation engines 208, 214, 220, 226 includes a register. For example, each of the auto-negotiation engines 208, 214, 220, 226 may be provided by a physical layer transceiver (PHY) device, with each PHY device further including a PHY register. While a specific example has been provided, one of skill in the art in possession of the present disclosure will recognize that the auto-negotiation engines and functionality associated therewith may be provided in a variety of manners known in the art while remaining within the scope of the present disclosure. Further, each of the auto-negotiation engines 208, 214, 220, 226 is configured to perform an auto-negotiation function with, for example, a respectively coupled peer device, as discussed in further detail below.

Figure 3:
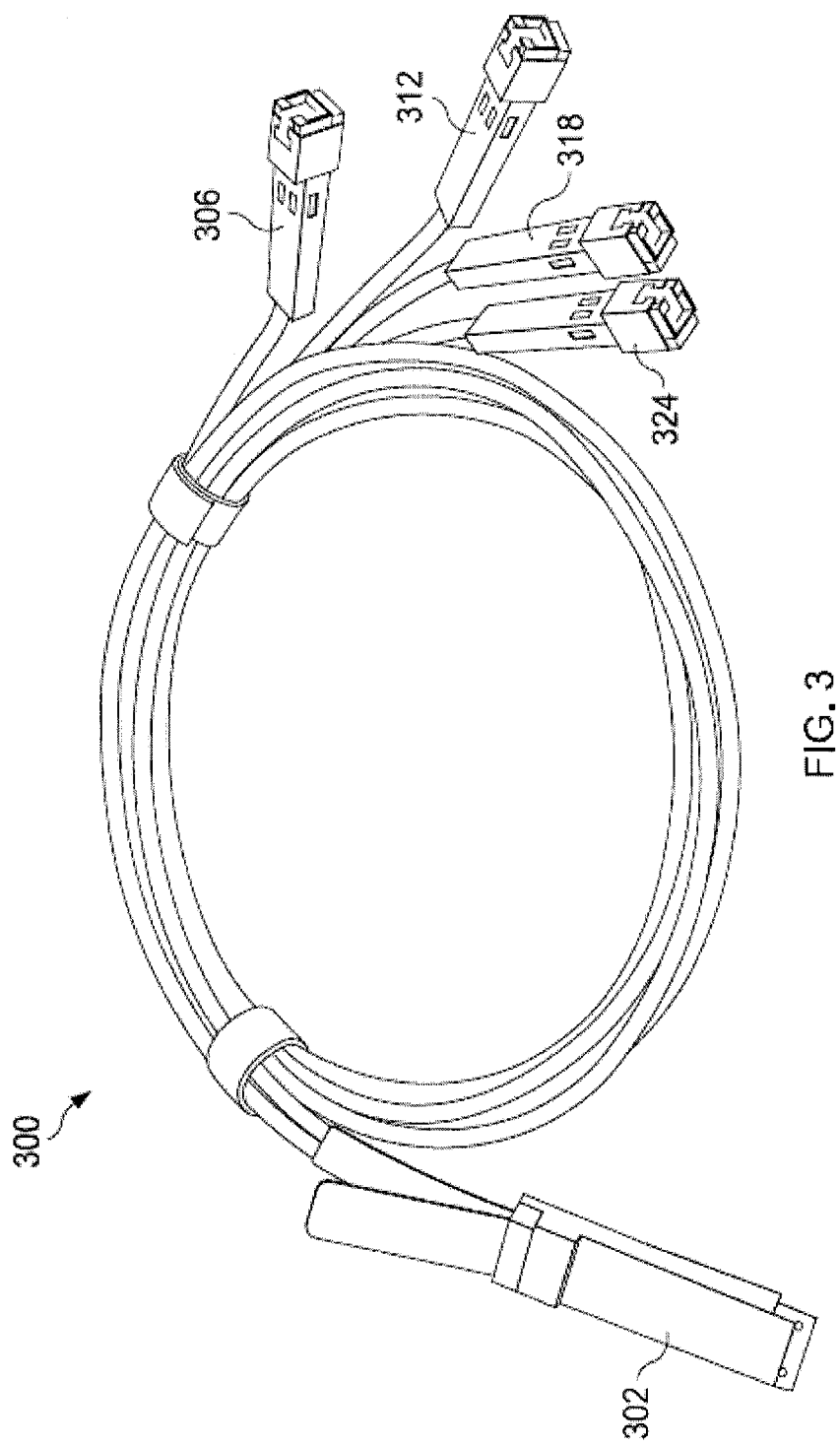
FIG. 3 is a schematic view illustrating an embodiment of the self-configuring port system illustrated in FIG. 2.

Referring now to FIG. 3, an embodiment of a self-configuring port system 300 is illustrated. In some of the embodiments discussed below, the self-configuring port system 300 is described as a breakout cable useful for providing one-to-many communication between a network switch port and a plurality of peer devices. The self-configuring port system 300 is an embodiment of the self-configuring port system 200 of FIG. 2. For example, the self-configuring port system 300 includes a first type interface device, illustrated in FIG. 3 as a QSFP module 302 (which may be the transceiver module 202 discussed above with reference to FIG. 2), and a plurality of second type interface devices, illustrated in FIG. 3 as BASE-T devices 306, 312, 318, 324 (which may be the interface devices 206, 212, 218, 224 discussed above with reference to FIG. 2). The BASE-T devices 306, 312, 318, 324 are each coupled to the QSFP module 302 by at least one cable. QSFP module 302 is configured to couple to a network switch port, and BASE-T devices 306, 312, 318, 324 are each configured to couple to a respective peer device, as discussed below. Each of the BASE-T devices 306, 312, 318, 324 also includes a PHY device that provides an auto-negotiation engine (not shown), as discussed above with reference to FIG. 2.

Figure 4:
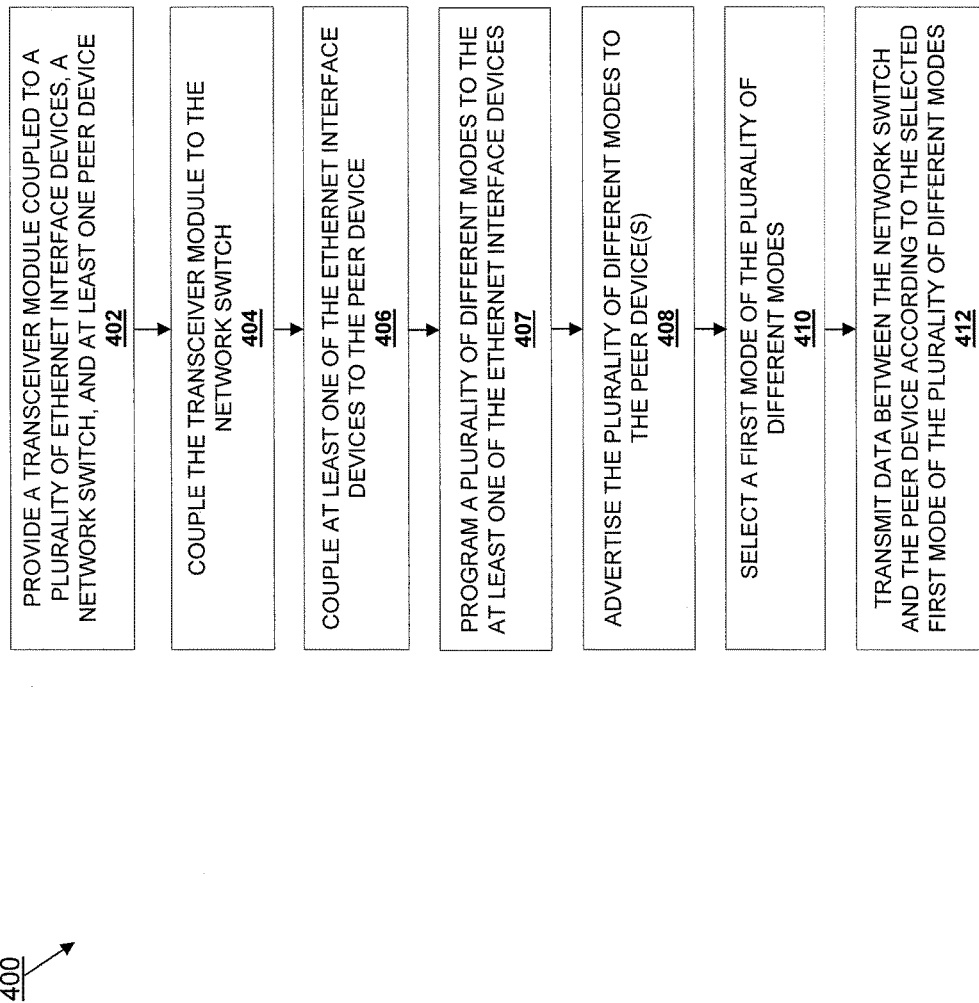
FIG. 4 is a flow chart illustrating an embodiment of a method for configuring a port on a network switch.
Figure 5:
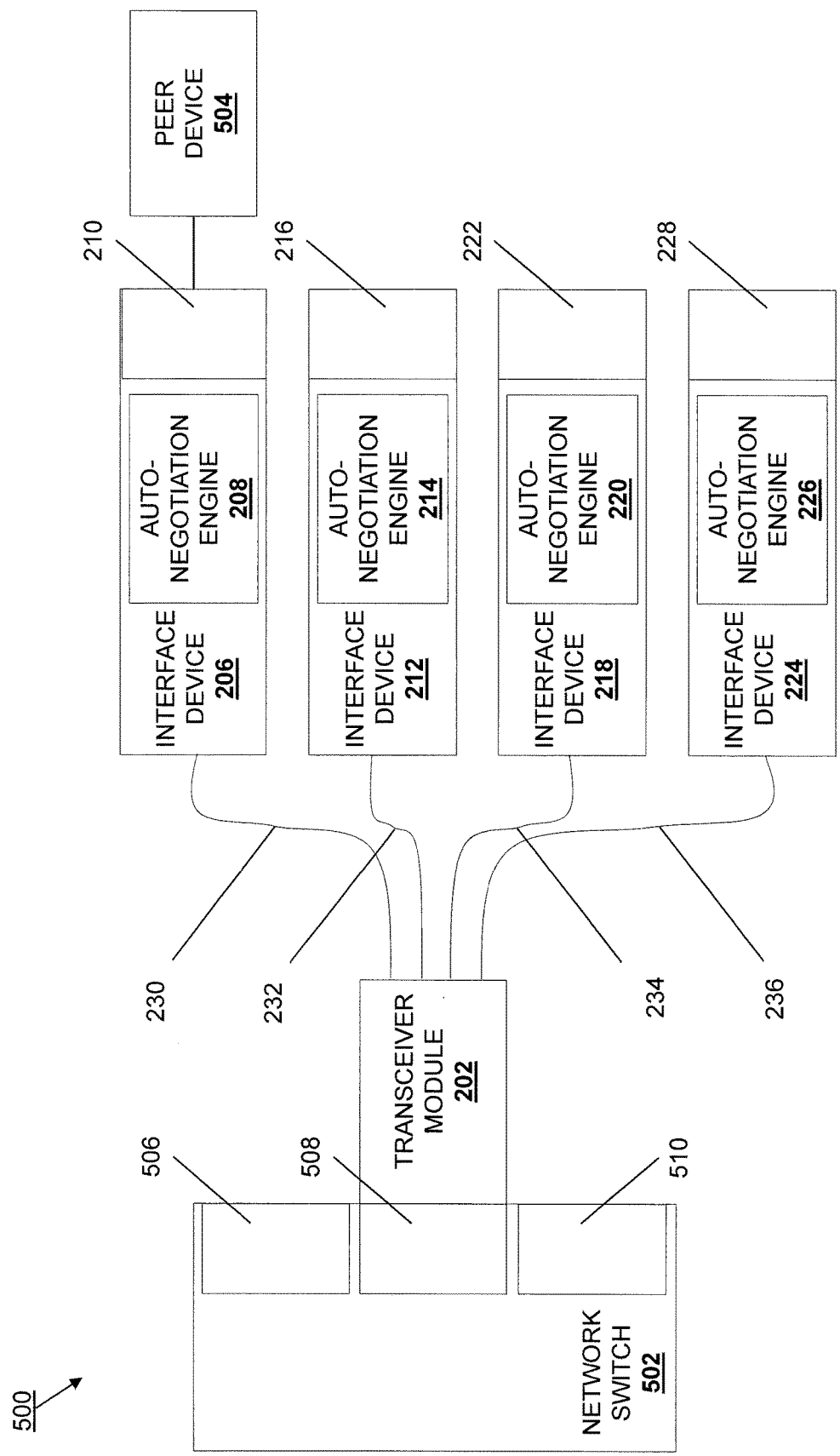
FIG. 5 is a schematic view illustrating an embodiment of an IHS network.

Referring now to FIG. 4, an embodiment of a method 400 for configuring a port on a network switch is illustrated. The method 400 begins at block 402 where a transceiver module that is coupled to a plurality of Ethernet interface devices, a network switch IHS, and at least one peer device, may each be separately provided. In an embodiment, the self-configuring port system 200 discussed above with reference to FIG. 2, including the transceiver module 202 coupled to the plurality of interface devices 206, 212, 218, 224, is provided. In an alternative embodiment, the self-configuring port system 300 discussed above with reference to FIG. 3, including the QSFP module 302 coupled to the plurality of BASE-T devices 306, 312, 318, 324, is provided. For example, in the embodiment illustrated in FIG. 5 and discussed below, the self-configuring port system 200 (or the self-configuring port system 300) is provided as part of IHS network 500 (FIG. 5). The IHS network 500 also illustrates a provided network switch IHS 502 and at least one peer device 504.

In some embodiments discussed below, the network switch IHS 502 may be referred to as an Ethernet switch IHS or network IHS, but other Ethernet devices and IHSs (e.g., server IHS's, storage IHS's, desktop IHS's, portable IHS's, and/or a variety of other IHSs and devices) are envisioned as falling within the scope of the present disclosure. The network switch IHS 502 may be the IHS 100, discussed above with reference to FIG. 1, and/or may include some or all of the components of the IHS 100. In various embodiments, the network switch IHS 502 includes a plurality of Ethernet switch IHS components (e.g., the processor 102, storage device 108, system memory 114, and/or other IHS components discussed above with reference to FIG. 1, switching IHS components know in the art, and/or a variety of other IHS components known in the art). The network switch IHS 502 also includes a plurality of Ethernet ports 506, 508, 510. In an embodiment, the plurality of Ethernet ports 506, 508, 510 are female Ethernet ports. For example, the plurality of Ethernet ports 506, 508, 510 may include female QSFP or QSFP+ ports, SFP or SFP+ ports, female RJ45 ports, and/or a variety of other female Ethernet ports known in the art. In an embodiment, the network switch IHS 502 is configured to communicate through the Ethernet ports 506, 508, 510 using Ethernet protocol signals. Although the network switch IHS 502 is shown to include the three Ethernet ports 506, 508, 510, it will be understood that in various alternative embodiments, the network switch IHS 502 may include more than three Ethernet ports, other types of ports, and/or a variety of other modifications known in the art of network switch IHSs.

In the embodiments discussed herein, each of the Ethernet ports 506, 508, 510 is configured to operate in a plurality of different modes. For example, the plurality of different modes may include transmission parameters such as transmission speed, duplex mode, flow control, and/or a variety of other transmission parameters known in the art. In some embodiments, each of the Ethernet ports 506, 508, 510 also includes a corresponding PHY device and/or a corresponding network register. As discussed in more detail below and with reference to FIGS. 4 and 5, the self-configuring port system 200 provides for a first mode of the plurality of different modes to be automatically selected (e.g., without instructions from a user) for use in transmitting data between any one of the Ethernet ports 506, 508, 510 and a respective peer device (e.g., the peer device 504) that is coupled to that port through the interface devices 206, 212, 218, and 224 based on that peer device supporting the first mode.

In some embodiments discussed below, the at least one peer device may be referred to as a BASE-T device, but in various embodiments may include at least one of several variants such as a 1000BASE-T device, a 100BASE-T device, and a 10BASE-T device, as well as other BASE-T devices known in the art which are capable of interfacing (either by directly mating or by way of an interposed cable) with for example, the interface devices 206, 212, 218, 224 (FIGS. 2 and 5) or the BASE-T devices 306, 312, 318, 324 (FIG. 3). Furthermore, the self-configuring port system 200 may include different types of interface devices (e.g., other than BASE-T type interface devices) that will then provide for the use of other compatible types of peer devices.

The method 400 then proceeds to block 404 where the transceiver module is coupled to the network switch IHS. Referring to FIGS. 2 and 5, in an embodiment of block 404, the transceiver module 202 is coupled to the network switch IHS 502. In one example, the transceiver interface 204 of the transceiver module 202 couples to the Ethernet port 508 of the network switch IHS 502, but in other examples the transceiver module 202 may alternatively couple to the network switch IHS 502 by way of the Ethernet port 506 or the Ethernet port 510. The method 400 then proceeds to block 406 where at least one of the Ethernet interface devices is coupled to the at least one peer device. Referring to FIGS. 2 and 5, in an embodiment of block 406, the interface device 206 is coupled to the peer device 504. In one example, the interface port 210 of the interface device 206 couples to the peer device 504 by way of a cable 512. In other embodiments, the peer device 504 may directly mate to the interface device 206 via the interface port 210. In other examples, the peer device 504 may alternatively couple to another interface device such as interface device 212, interface device 218, or interface device 224. Furthermore, each of the interface devices 206, 212, 218, and 224 may be coupled to a peer device (similar to the peer device 504) at the same time.

The method 400 then proceeds to block 407 where a plurality of different modes is programmed into the at least one of the Ethernet interface devices. Referring to FIGS. 2 and 5, in an embodiment of block 407, a plurality of different modes supported by the Ethernet port 508 of the network switch IHS 502 are written to the interface device 206. In one example, the network switch IHS 502 may write the plurality of different modes supported by the Ethernet port 508 to the register of the auto-negotiation engine 208. In the embodiments discussed herein, the network switch IHS 502, which includes a plurality of Ethernet switch IHS components (e.g., the processor 102, storage device 108, system memory 114, etc.), also includes program code that when executed by the processor cause the network switch IHS 502 to write to one or more of the registers of the auto-negotiation engines 208, 214, 220, and/or 226. Thus, in one example as described above, the network switch IHS 502 may write to the register of the auto-negotiation engine 208.

The method 400 then proceeds to block 408 where the plurality of different modes are advertised to the peer device(s). As discussed above, each of the Ethernet ports 506, 508, 510 is configured to operate in a plurality of different modes, where the plurality of different modes supported by a respective Ethernet port of the network switch IHS 502 are written to an auto-negotiation engine register of a respective interface device. In an embodiment of block 408 and with reference to FIGS. 2 and 5, each of the auto-negotiation engines 208, 214, 220, 226 in the interface devices 206, 212, 218, and 224, respectively, is configured to advertise each of the plurality of different modes available to its connected Ethernet port on the network switch 502 to its respectively coupled peer device. In one example, the auto-negotiation engine 208 advertises the plurality of different modes available to the Ethernet port 508 to the peer device 504. In a specific example, the Ethernet port 508 may support 10M, 100M, and 1000M Full Duplex modes, and at block 408, the auto-negotiation engine 208 may advertise to the peer device 504 the 10M, 100M, and 1000M Full Duplex modes. In some embodiments, the advertising performed by an auto-negotiation engine (e.g., the auto-negotiation engine 208) is part of an auto-negotiation function performed between an interface device (e.g., the interface device 206) and a respectively coupled peer device (e.g., the peer device 504). In other embodiments, the advertising performed by an auto-negotiation engine is independent with respect to the auto-negotiation function.

The method 400 then proceeds to block 410 where a first mode of the plurality of different modes is selected. In an embodiment of block 410 and with reference to FIGS. 2 and 5, with the interface device 206 coupled to the peer device 504 and advertising the plurality of different modes to the peer device 504, the auto-negotiation engine 208 performs an auto-negotiation function with the respective peer device 504, and the first mode of the plurality of modes is selected. As is known in the art, an auto-negotiation function provides a capability for coupled devices, such as the interface device 206 and the peer device 504, to share their capabilities and choose negotiated transmission parameters accordingly. As used herein, the term "negotiated transmission parameter" is equivalently referred to as a "negotiated value". In one embodiment, the auto-negotiation function may include the interface device 206 and the peer device 504 each selecting a negotiated value including their highest, commonly shared transmission speed. In another embodiment, the auto-negotiation function may include the interface device 206 and the peer device 504 each selecting a negotiated value including a commonly shared duplex mode. In yet other embodiments, the auto-negotiation function may include a flow control mechanism, whereby the flow of data between coupled devices, such as the interface device 206 and the peer device 504, is temporarily stopped. While a few examples of auto-negotiated functions have been provided, a wide variety of other auto-negotiation functions and features are envisioned as falling within the scope of the present disclosure.

In various embodiments, and with reference to FIGS. 2, 4, and 5, in response to the auto-negotiation function discussed above, a negotiated value is written to the register of the auto-negotiation engine. For example, responsive to the auto-negotiation function between the interface device 206 and the respectively coupled peer device 504, a negotiated value is written to the register of the auto-negotiation engine 208. In the embodiments discussed herein, registers of the auto-negotiation engines (e.g., auto-negotiation engine 208) may also be read by the network switch IHS 502. For example, the network switch IHS 502, which includes a plurality of Ethernet switch IHS components (e.g., the processor 102, storage device 108, system memory 114, etc.), also includes program code that when executed by the processor cause the network switch IHS 502 to read one or more of the registers of the auto-negotiation engines 208, 214, 220, and/or 226. Thus, in some embodiments, in response to the auto-negotiation function between the interface device 206 and the respectively coupled peer device 504, the register of the auto-negotiation engine 208 is read by the network switch IHS 502, and the negotiated value is written to a network register corresponding to a network switch port on the network switch 502 that is coupled to that auto-negotiation engine 208. In one example, the negotiated value is written to the network register corresponding to the Ethernet port 508 of the network switch IHS 502. In another example, the negotiated value is written to a PHY device corresponding to the Ethernet port 508 of the network switch IHS 502. Thereby, in the various embodiments described herein, the negotiated value is programmed into the network switch IHS 502 in response to the auto-negotiation function between the interface device 206 and the respectively coupled peer device 504, thus eliminating the need for manual configuration of the Ethernet port 508 of the network switch IHS 502.

The method 400 then proceeds to block 412 where data is transmitted between the network switch and the peer device according to the selected first mode of the plurality of different modes. In an embodiment of block 412 and with reference to FIGS. 2 and 5, data is transmitted between the network switch IHS 502 and the peer device 504 in accordance with the selected first mode of the plurality of modes. As discussed above, in other embodiments, other peer devices similar to the peer device 504 may be coupled to others of the interface devices 212, 218, 224. In such embodiments, the communications between the network switch IHS 502 and the respective peer device(s) would proceed as described above to allow the network switch 502 to communicate with each peer device according to the negotiated mode. In alternative embodiments, for example when more than one interface device is coupled to a respective peer device, the auto-negotiation function between an interface device and its respectively coupled peer device may remain independent from one another, such that the network switch IHS 502 may transmit data according to different modes for each of the interface devices and their respectively coupled peer devices.

Thus, systems and methods have been described that provide an improved system for configuring network switches to communicate with peer devices according to different modes of operation. By using a self-configuring port system with a first end coupled to a network switch and a second end coupled to a peer device by way of an interface device, along with an auto-negotiation engine in the interface device that performs an auto-negotiation function with the peer device to negotiate a value that may then be retrieved by and programmed into the network switch, the need for time-consuming and error-prone manual configuration of the network switch is eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A self-configuring Ethernet system, comprising:
   a first type interface device that is configured to be received by an Ethernet port on a network switch, wherein the Ethernet port on the network switch is associated with a physical layer transceiver (PHY) device and is configured to operate in a plurality of different modes; and
   a plurality of second type interface devices that are each coupled at a first end to the first type interface device by at least one cable, wherein each of the plurality of second type interface devices includes an auto-negotiation engine that is configured, when a second end of that second type interface device is received by an Ethernet port of a respective peer device, to:
      advertise each of the plurality of different modes of the Ethernet port on the network switch to the respective peer device;
      perform an auto-negotiation function with the respective peer device to select a first mode of the plurality of different modes of the Ethernet port on the network switch for use in transmitting data between the Ethernet port on the network switch and the respective peer device using that second type interface device; and
      provide the first mode to the PHY device associated with the Ethernet port on the network switch.

2. The self-configuring Ethernet system of claim 1, wherein the first type interface device is a quad small form-factor pluggable (QSFP) transceiver module.

3. The self-configuring Ethernet system of claim 1, wherein each of the plurality of second type interface devices is a BASE-T interface device.

4. The self-configuring Ethernet system of claim 1, wherein each auto-negotiation engine includes a register, and wherein each auto-negotiation engine is configured to:
   write a negotiated value to the register based on the performance of the auto negotiation function.

5. The self-configuring Ethernet system of claim 4, wherein each auto-negotiation engine is configured to:
   write the negotiated value to the PHY device associated with the Ethernet port on the network switch.

6. The self-configuring Ethernet system of claim 1, wherein the first mode of the plurality of different modes includes a transmission parameter selected from a group comprising: transmission speed; duplex mode; and flow control.

7. An information handling system (IHS) network, comprising:
   a first IHS that is configured to operate in a plurality of different modes;
   a second IHS;
   a first type interface device that is received by an Ethernet port on the first IHS, wherein the Ethernet port is associated with a physical layer transceiver (PHY) device; and a second type interface device that is coupled at a first end to the first type interface device by a cable, and at a second end to an Ethernet port of the second IHS, wherein the second type interface device includes an auto-negotiation engine that:
  advertises each of the plurality of different modes of the first IHS to the second IHS;
  performs an auto-negotiation function with the second IHS to select a first mode of the plurality of different modes of the first IHS for use in transmitting data between the first IHS and the second IHS using the second type interface device; and
  provides the first mode to the PHY device associated with the Ethernet port on the first IHS.

8. The IHS network of claim 7, wherein the first type interface device is a quad small form-factor pluggable (QSFP) transceiver module.

9. The IHS network of claim 7, wherein each of the second type interface device is a BASE-T interface device.

10. The IHS network of claim 7, wherein the auto-negotiation engine includes a register, and wherein the auto-negotiation engine is configured to:
  write a negotiated value to the register.

11. The IHS network of claim 10, wherein the auto-negotiation engine is configured to:
  write the negotiated value to the PHY device associated with the Ethernet port on the network switch.

12. The IHS network of claim 7, wherein the first mode of the plurality of different modes includes a transmission parameter selected from a group comprising: transmission speed; duplex mode; and flow control.

13. A method for configuring an operating mode of a network switch, comprising:
  coupling a first type interface device to a first IHS via an Ethernet port that is associated with a physical layer transceiver (PHY) device and that is configured to operate in a plurality of different modes, wherein a second type interface device is coupled at a first end to the first type interface device by a cable;
  coupling a second end of the second type interface device to an Ethernet port on a peer device;
  advertising, by an auto-negotiation engine in the second type interface device, each of the plurality of different modes of the first IHS to the peer device;
  auto-negotiating, by the auto-negotiation engine in the second type interface device, a mode of operation with the peer device;
  selecting, by the auto-negotiation engine in the second type interface device based on the auto-negotiating, a first mode of the plurality of different modes of the first IHS for use in transmitting data between the first IHS and the peer device through the second type interface device; and
  providing, by the auto-negotiation engine in the second type interface device, the first mode to the PHY device associated with the Ethernet port on the first IHS.

14. The method of claim 13, wherein the first type interface device is a quad small form-factor pluggable (QSFP) transceiver module.

15. The method of claim 13, wherein each of the plurality of second type interface devices is a BASE-T interface device.

16. The method of claim 13, further comprising:
  writing, by the auto-negotiation engine in the second type interface device based on the auto-negotiating, a negotiated value to a register of the auto-negotiation engine.

17. The method of claim 16, further comprising:
  reading, by the auto-negotiation engine in the second type interface device, the negotiated value from register of the auto-negotiation engine and, in response, writing the negotiated value to the PHY device of the Ethernet port of the first IHS.

18. The method of claim 16, further comprising:
  reading by the auto-negotiation engine in the second type interface device, the register of the auto-negotiation engine and, in response, selecting the first mode of the plurality of different modes for use in transmitting data between the first IHS and the peer device.

19. The method of claim 13, further comprising:
  writing, by the auto-negotiation engine in the second type interface device based on the auto-negotiating, a negotiated value to an Ethernet port register associated with the Ethernet port on the first IHS.

20. The method of claim 13, wherein the first mode of the plurality of different modes includes a transmission parameter selected from a group comprising: transmission speed; duplex mode; and flow control.

* * * * *